No. 774,677. Patented November 8, 1904.

UNITED STATES PATENT OFFICE.

LEONHARD LEDERER, OF SULZBACH, GERMANY.

ELASTIC HORN-LIKE SUBSTANCE AND PROCESS OF PRODUCING SAME.

SPECIFICATION forming part of Letters Patent No. 774,677, dated November 8, 1904.

Application filed May 13, 1902. Serial No. 107,170. (No specimens.)

*To all whom it may concern:*

Be it known that I, LEONHARD LEDERER, chemist, doctor of philosophy, a subject of the King of Bavaria, residing in Sulzbach, Oberpfalz, Germany, have invented Elastic Horn-Like Substances and a Process of Producing the Same, of which the following is a specification.

I have discovered that acetyl-cellulose, like nitrocellulose, can be changed into a substance of an elastic horn-like character. I have found suitable for this purpose certain organic substances which contain one or more of the hydroxyl, aldehyde, amid, and ketone groups. Acid amids are also suitable for the purpose. When these substances are caused to act upon the cellulose acetate, an interlocking of the molecules appears to take place; but as to the exact nature of the action no definite explanation can be given, because of the complex nature of the cellulose molecule. A soft or more or less hard pliable mass may be produced, according to the particular method of production followed. While in a soft state impressions of etched or engraved plates may be taken on the material, and the most delicate and fine portions of the engraving or etching will be reproduced. When hardened, the material may be cut and polished. In fact, the product in many respects resembles celluloid and can be used in the same way, but has the advantage over celluloid that it is free from inflammability.

By way of example I may state that the process of my invention may be carried out in the following ways:

(*a.*) One (1) part of cellulose acetate and one and one-half (1½) parts of phenol are fused at about 40° to 50° centigrade. As soon as a clear solution has formed the mass is placed on warm glass or metal plates and is then allowed to cool gradually. After standing for several days the mass, which is somewhat like caoutchouc at first, hardens into pliable sheets which can be worked or employed like celluloid.

(*b.*) Another method of operation is to mix cellulose acetate intimately with one-half its weight of phenol and then subject it to great pressure. The pressed mass is then allowed to completely harden in the air.

(*c.*) Again, an intimate mixture of equal parts of acetyl-cellulose and chloral hydrate or anilin may be subjected to pressure at a temperature of 50° to 60° centigrade, and then the pressed mass is allowed to harden in the air.

The like method is followed when I employ a ketone—for instance, acetophenon—or an amid—as, for example, acetamid.

I claim as my invention—

1. The herein-described process of producing horn-like substances, consisting in reacting upon acetyl-cellulose with an organic body of the character described.

2. The herein-described process of producing horn-like substances, consisting in reacting, under heat, upon acetyl-cellulose with an organic body of the character described.

3. The herein-described process of producing horn-like substances, consisting in reacting, under heat and pressure, upon acetyl-cellulose with an organic body of the character described.

4. The herein-described process of producing horn-like substances, consisting in reacting upon acetyl-cellulose with a phenol, substantially as described.

5. The herein-described substitute for horn, celluloid and the like, consisting of acetyl-cellulose, in combination with an organic body of the character described.

6. The herein-described substitute for horn, celluloid and the like, consisting of acetyl-cellulose, in combination with a phenol, substantially as described.

7. A stable derivative of cellulose, as cellulose acetate, modified by the addition or presence of a solvent of low volatility.

8. A new composition of matter containing a stable derivative of cellulose, as cellulose acetate and a solvent of low volatility.

In testimony whereof I have signed my name to this specification in the presence of two subscribing witnesses.

LEONHARD LEDERER.

Witnesses:
 FRED MARSDEN,
 JOHANN STROBEL.